April 13, 1965 H. M. GEYER 3,177,982
ACTUATOR SYSTEM
Filed May 8, 1962
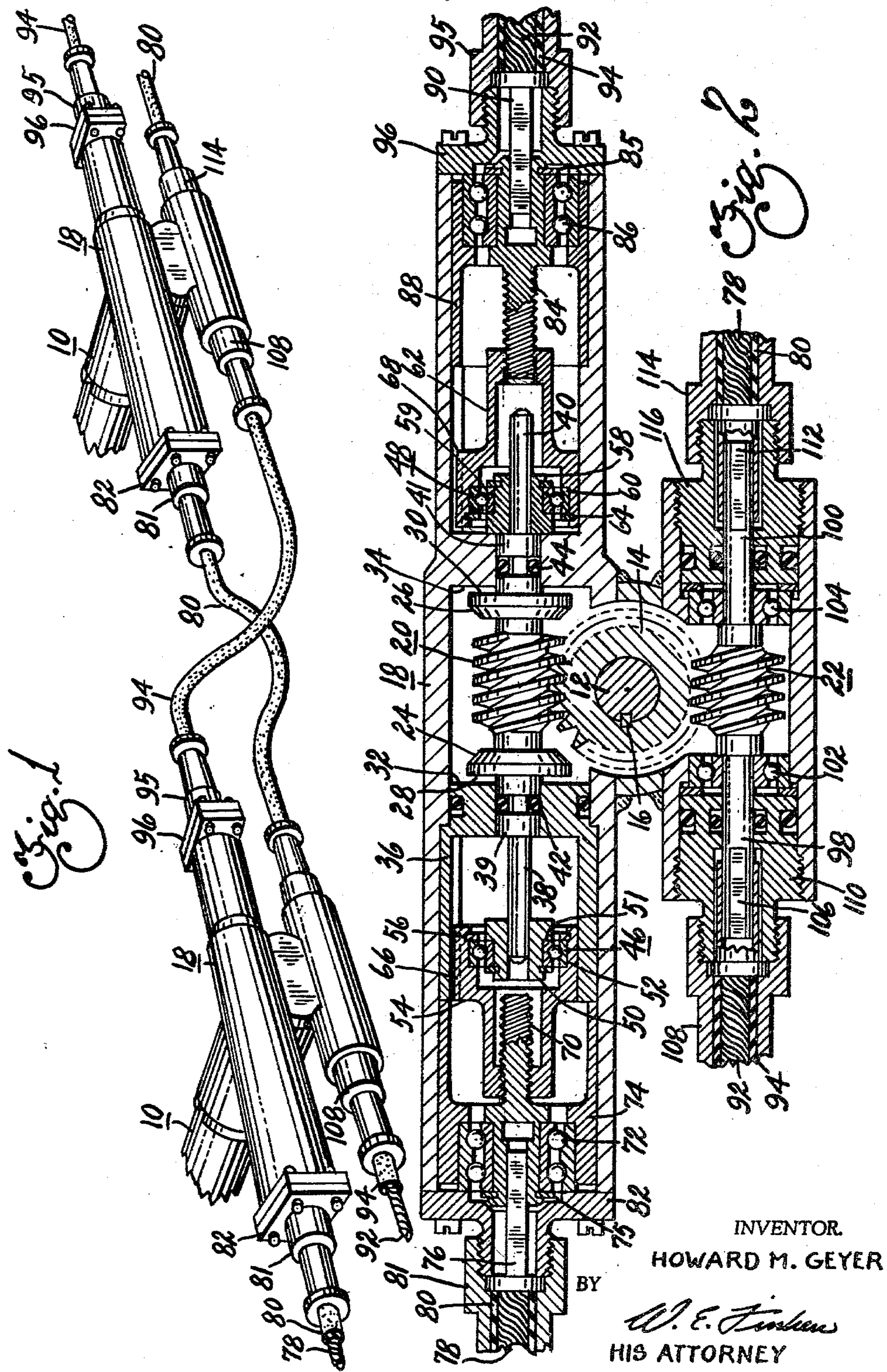
INVENTOR.
HOWARD M. GEYER
BY W. E. Finken
HIS ATTORNEY United States Patent Office 3,177,982
Patented Apr. 13, 1965

3,177,982
ACTUATOR SYSTEM

Howard M. Geyer, Dayton, Ohio, assignor to General Motors Corporation, Detroit, Mich., a corporation of Delaware Filed May 8, 1962, Ser. No. 193,143
12 Claims. (Cl. 188—110)

This invention pertains to an actuator system, and particularly to a system including a plurality of self-locking actuators which are operatively interconnected for sequential operation.

In some aircraft installations, particularly for operating multiple cargo doors of transport aircraft, it is necessary to utilize a plurality of sequentially operated actuators to open and close the multiple cargo doors. The present invention relates to an actuator system embodying mechanically synchronized means for sequentially controlling the operation of a plurality of self-locking actuators. In the specifically disclosed embodiment, the actuators are of the linear-hydraulic type, and each actuator is operated throughout its full stroke prior to initiating operation of the succeeding actuator, and this sequence is maintained in both directions in a system for opening and closing the multiple cargo doors of an aircraft. To achieve the desired mode of operation, the actuators are of the type including self-engageable, load sensitive, bidirectional locking means.

Accordingly, among my objects are the provisions of an actuator system including a plurality of self-locking actuators and means for sequentially controlling the operation thereof; the further provision of mechanically synchronized means for sequentially controlling the operation of a plurality of self-locking actuators; and the still further provision of mechanically synchronized means for sequentially controlling a plurality of linear-hydraulic actuators, each actuator having self-engageable, load sensitive, bidirectional locking means.

The aforementioned and other objects are accomplished in the present invention by mechanically interconnecting the lock releasing means of the several actuators in the system in a manner whereby the locking means of each actuator can be sequentially released to permit actuator movement in one direction or the other in accordance with the position which is demanded of the load devices connected to the several actuators. In order to achieve sequential operation, the actuators may be of the type disclosed in my Patent 2,979,034, and thus are of the linear-hydraulic type which embody a rotatable and axially movable worm shaft assembly. The worm shaft assembly of each actuator carries a pair of friction locking elements, or thrust collars, that are engageable with brake surfaces so as to lock the actuator against movement in either direction due to external loading or hydraulic pressure. Each actuator includes a rotatable screw shaft which is operatively connected to its respective actuator piston so as to rotate in response to piston movement. A worm wheel is attached to each screw shaft, each worm wheel meshing with its respective worm shaft assembly.

The several actuators in the system are mounted in spaced relation to each other and in order to mechanically synchronize the sequence and operation of the several actuators, mechanical servo means are provided for releasing the locking means of each actuator to permit movement thereof in either direction, but not both directions, at the same time. The mechanical servo means for releasing the locking means of each succeeding actuator in the progression are controlled by the preceding actuator in the system, and this is true in both directions of operation.

To accomplish this end, the worm wheel of each actuator meshes with a second worm which is connected by flexible shafts to the mechanical servo lock releasing means of the preceding and succeeding actuators in the multiple actuator system.

Further objects and advantages of the present invention will be apparent from the following description, reference being had to the accompanying drawing, wherein a preferred embodiment of the present invention is clearly shown.

In the drawing:

FIGURE 1 is a fragmentary view with parts broken away depicting the actuator system of this invention.

FIGURE 2 is an enlarged longitudinal sectional view of the mechanically synchronized sequencing means.

With reference to FIGURE 1, the actuator system of the present invention comprises a plurality of linear-hydraulic actuators 10, each actuator having self-engageable, load sensitive, bidirectional locking means. It is to be understood that in accordance with the disclosure of my Patent 2,979,034, each actuator includes a cylinder having a reciprocable piston disposed therein, each piston dividing its actuator cylinder into opposed chambers. The piston rods, not shown, extend outside of the actuators and are connected to the movable load devices, not shown. By virtue of the connection of the piston rods to the devices to be operated, the actuators may be subjected to external loads in both directions dependent upon the position of the load devices. It is to be understood that actuator movement is effected by subjecting the actuator pistons to a pressure differential by reason of connecting opposed actuator chambers to pressure and drain, respectively, so as to effect piston movement in the desired direction.

Moreover, each actuator piston carries, or is otherwise suitably connected to, a nut, both the nut and the piston being restrained against rotation. The nut of each actuator threadedly engages a reversible screw shaft 12, as seen in FIGURE 2, which is journalled within each actuator cylinder. A worm wheel 14 is keyed at 16 to each screw shaft 12 and thus is connected for rotation therewith. The worm wheels 14 are enclosed in housings 18 secured to their respective actuator cylinders.

Each worm wheel 14, as seen in FIGURE 2, meshes with an axially movable and rotatable, reversible, worm shaft assembly 20 and a rotatable worm shaft assembly 22. The axially movable and rotatable worm shaft assembly 20 is arranged on an axis transverse to the axis of the screw shaft 12. Each worm shaft assembly 20 carries a pair of spaced thrust collars 24 and 26. The thrust collars 24 and 26 have braking surfaces 28 and 30, respectively, engageable with stationary braking surfaces 32 and 34. Brake surface 34 is integral with the housing 18, while braking surface 32 is formed on a sleeve member 36 which is suitably restrained against rotation relative to the housing 18.

Each worm shaft assembly 20 has oppositely extending stub shaft portions 38 and 40 which receive O-ring seals 42 and 44, respectively, and are supported for rotation by ball bearing assemblies 46 and 48, respectively. The stub shafts 38 and 40 have shoulders 39 and 41, respectively. The bearing assembly 46 includes an insert 50 within which the stub shaft 38 is slidably supported, an inner race 51 carried by the insert 50 and an outer race 52 which is retained in assembled relation with a nut 54 by a snap ring 56. Similarly, the ball bearing assembly 48 includes an insert 58 within which the stub shaft portion 40 is slidably supported, an inner race 59 carried by the insert 58, and an outer race 60 secured to a nut 62 by a snap ring 64. The nut 54 has a straight spline connection at 66 with the sleeve 36, while the nut 62 has a straight spline connection at 68 to the housing 18. Accordingly, the nuts 54 and 62 are restrained against rotation, although capable of axial movement relative to the worm shaft assembly 20 and the housing 18.

The nut 54 threadedly engages a reversible screw shaft 70 supported by a ball bearing assembly 72 in a second sleeve 74 disposed in the housing 18. The screw shaft 70 is restrained against axial movement by a snap ring 75, and has a suitable tongue and groove connection 76 with a flexible shaft 78 disposed in the conduit 80. The conduit 80 has a coupling 81 threadedly connected to a coupling member 82 attached to the housing 18. The nut 62 threadedly engages a reversible screw shaft 84 journalled by ball bearing assembly 86 in a sleeve 88. The screw shaft 84 is likewise restrained against axial movement by a snap ring 85, and has a tongue and groove coupling 90 with a flexible shaft 92. The flexible shaft 92 is enclosed in a conduit 94 which carries a coupling 95 having a threaded connection with a coupling 96 attached to the housing 18.

It will be appreciated that during operation of each actuator, its screw shaft 12 will rotate in one direction or the other, thus rotating the worm wheel 14 which will exert an axial thrust on the worm shaft assembly 20. Thus, counterclockwise rotation of the worm wheel 14 exerts an axial thrust on the worm shaft assembly 20 to the left, as viewed in FIGURE 2, thereby tending to urge the braking surface 28 of the collar 24 into engagement with the braking surface 32. Conversely, rotation of the worm wheel 14 in the clockwise direction, as viewed in FIGURE 2, exerts axial thrust on the worm shaft assembly to the right thereby tending to move the braking surface 30 of the collar 26 into engagement with the braking surface 34. Since the worm wheel 14 rotates in the counterclockwise direction during extending movement of its respective actuator piston, the thrust collar 24 constitutes the extend locking means, and the thrust collar 26 constitutes the retract locking means. The braking force of the locking means is directly proportional to the external load, and accordingly, the locking means operates as self-energized brakes.

In the instant actuator system, the worm shaft assemblies 20 can be positioned so that the thrust collar 24 engages its braking surface; so that the thrust collar 26 engages its braking surface; or centered whereat neither thrust collar engages its braking surface. The locking means are bidirectional in that actuator movement in either direction under external load or hydraulic pressure can be prevented, and the locking means can be released to permit actuator movement in either of, but not both directions at the same time.

The retract locking means are shown released in FIGURE 2. This is achieved by the mechanical servo including the screw shaft 84 and the nut 62. The screw shaft 84 is shown having a right hand thread and thus upon counterclockwise rotation of the screw 84, the nut 62 will be moved to the left. As the nut 62 moves to the left, the bearing insert 58 will engage the shoulder 41 of the worm shaft assembly 20 and move the assembly 20 to the left to disengage the surface 30 of the collar 26 from the surface 34. With the thrust collar 26 maintained disengaged from the braking surface 34, the worm wheel 14 and hence the screw shaft 12 are free to rotate in the clockwise direction, thus permitting retracting movement of the actuator. During axial movement of the worm shaft assembly 20 to the left due to counterclockwise rotation of the screw shaft 84, the stub shaft 38 slides further into the bearing insert 50.

In order to release the extend lock, the screw shaft 70, which is likewise shown having a right hand thread, must be rotated in the counterclockwise direction to move the nut 54 to the right, and thus through the bearing insert 50 prevent movement of the worm shaft assembly 20 to the left to maintain the thrust collar 24 disengaged from its braking surface 32. Under these conditions, the worm wheel 14 of the screw shaft 12 is free to rotate in the counterclockwise direction, and thus the actuator can be extended.

In order to sequentially release the locking means of successive actuators in the multiple actuator system, the present invention comprehends means for sequentially releasing the locking means of each succeeding actuator only after the immediately preceeding actuator has completed its full stroke. To effectuate this end each worm shaft assembly 22 is driven by its respective worm wheel 14. Each worm shaft assembly 22 includes oppositely extending stub shaft portions 98 and 100 which are journalled by ball bearing assemblies 102 and 104, respectively. The worm shaft assembly is, as shown, restrained against axial movement in both directions. The stub shaft 98 has a tongue and groove coupling 106 with the flexible shaft 92 disposed in conduit 94. The conduit 94 has a second threaded coupling 108 in engagement with an end cap 110 which closes one end of the housing for the worm shaft assembly 22. Similarly, the stub shaft 100 has a tongue and groove connection 112 with the flexible shaft 78. The conduit 80 has a threaded coupling 114 in engagement with an end cap 116 which closes the other end of the housing for worm shaft 22.

As seen in FIGURE 1, the flexible drive shaft 92 of each actuator is connected to the left hand output of the worm shaft assembly 22 of the adjacent succeeding actuator in the multiple actuator system. The flexible drive shaft 78 of each actuator is connected to the right hand output of the worm shaft assembly 22 of the adjacent preceding actuator.

It is to be understood that the actuators at each end of the system, that is the first and last actuators, only have one flexible drive shaft connection to their worm shaft assemblies 22, while each intermediate actuator assembly, such as the two shown in FIGURE 1, have flexible drive shaft connections at both ends of their worm shaft assemblies 22. Furthermore, the first and last actuator assemblies may have their flexible shafts 78 and 79, respectively, connected to a remotely located manual control, which may or may not include a servo assist mechanism for controlling the direction of sequential operation of the several actuators in the system. In order to sequentially release the locking means of the several actuators to sequentially retract the same from the last to the first, the manual control for actuating the flexible drive shaft 92 of the last actuator is rotated so as to move the nut 62 of the last actuator to the left to the position shown in FIGURE 2, thereby shifting its worm shaft assembly 20 to the left and disengaging thrust collar 26 from its braking surface 34. In this manner the locking means of the last actuator are released so as to permit retraction thereof. It is to be understood that only a single hydraulic valve is required in the system for simultaneously connecting either the retract or the extend chambers of all actuators to pressure or drain. During such retraction the screw shaft 12 of the last actuator, its associated worm shaft 22 rotates in the clockwise direction as viewed in FIGURE 2, thereby driving the worm shaft 22 so as to rotate its flexible drive shaft 92 so that when the last actuator has been completely retracted, the retract locking means for the next adjacent inboard actuator will be released. Thus, each actuator successively releases the retract locking mens of successive inboard actuators until all of the actuators are fully retracted.

To sequentially operate the actuators from their fully retracted positions to their fully extended positions, the manual input, not shown, is actuated to rotate the flexible drive shaft 78 of the first actuator, thus releasing the extend lock of the first actuator by effecting movement of its worm shaft assembly 20 to the right through the screw 70 and the nut 54. Hydraulic fluid under pressure, not shown, is supplied to all actuators, and the first actuator operates to release the extend locking means of the next successive actuator through its worm shaft assembly 22 and flexible drive shaft 78, and in this manner the extend locking means of all of the actuators in the system will be sequentially released until all of the actuators are fully extended.

While the embodiment of the invention as herein disclosed constitutes a preferred form, it is to be understood that other forms might be adopted.

What is claimed is as follows:

1. An actuator system including, a plurality of actuators, each actuator having independent locking means operable to prevent movement of its respective actuator in both directions, and means operable to sequentially release the locking means of said plurality of actuators to permit sequential movement of said actuators.

2. An actuator system including, a plurality of actuators, each actuator having independent bidirectional locking means operable to prevent movement of its respective actuator in both directions, and means operable to sequentially release the locking means of said plurality of actuators to permit seqeuntial movement of said actuators in only one direction at a time.

3. An actuator system including, a plurality of actuators, each actuator having bidirectional locking means and means to release its locking means to permit movement in either direction, and mechanical means interconnecting the lock releasing means of adjacent actuators in said system for sequentially operating the lock releasing means of said actuators in a predetermined sequence so as to obtain sequential movement of said actuators.

4. A multiple actuator system including, a plurality of actuators, each actuator having bidirectional locking means and means to release the locking means of its respective actuator to permit movement thereof in either direction, each lock releasing means including a rotatable member, and torque transmitting means operatively interconnecting the rotatable members of adjacent actuators for sequentially operating the lock releasing means to obtain a predetermined sequential movement of the actuators in said multiple actuator system.

5. A multiple actuator system including, a plurality of actuators, each actuator having self-engageable, bidirectional, load sensitive locking means for preventing movement thereof in either direction, and means operable to sequentially release the locking means to obtain a predetermined sequential movement of the actuators in said multiple actuator system.

6. A multiple actuator system including, a plurality of actuators, each actuator having self-engageable, bidirectional, load sensitive locking means for preventing movement thereof in either direction and means to release the locking means of its respective actuator to permit movement thereof in either direction, and mechanical means interconnecting the lock releasing means of adjacent actuators in said system for sequentially operating the lock releasing means of each actuator in said multiple actuator system to obtain a predetermined sequential movement of the actuators in said multiple actuator system.

7. A multiple actuator system including, a plurality of actuators, each actuator having self-engageable, bidirectional, load sensitive locking means comprising a rotatable and axially movable assembly having a pair of spaced thrust collars and a pair of spaced braking surfaces engageable with said thrust collars when said assembly is moved axially in either direction from a centered position for preventing rotation of said assembly and thereby prevent movement of its respective actuator in one direction or the other, and means operable to sequentially release the locking means of each actuator in said multiple actuator system so as to obtain a predetermined, sequential movement of the actuators in said multiple actuator system.

8. A multiple actuator system including, a plurality of actuators, each actuator having self-engageable, bidirectional, load sensitive locking means comprising a rotatable and axially movable assembly having a pair of spaced thrust collars and a pair of spaced braking surfaces engageable with said thrust collars when said assembly is moved axially in either direction from a centered position for preventing rotation of said assembly and thereby prevent movement of its respective actuator in one direction or the other, each actuator having means operable to release the locking means of its respective actuator to permit movement thereof in either direction, and mechanical means interconnecting the lock releasing means of adjacent actuators in said multiple actuator system to obtain a predetermined seqential movement of the actuators in said multiple actuator system.

9. A multiple actuator system including, a plurality of actuators, each actuator having self-engageable, bidirectional, load sensitive locking means comprising a rotatable and axially movable assembly having a pair of spaced thrust collars and a pair of spaced braking surfaces engageable with said thrust collars when said assembly is moved axially in either direction from a centered position for preventing rotation of said assembly and thereby prevent movement of its respective actuator in one direction or the other, each actuator having means operable to release the locking means of its respective actuator to permit movement thereof in either direction comprising, a pair of rotatable screw shafts on opposite sides of said rotatable and axially movable assembly and a nonrotatable nut engaging each screw shaft and including means engageable with said rotatable and axially movable assembly for effecting axial movement thereof in one direction, and torque transmitting means interconnecting the screw shafts of each actuator with adjacent actuators to sequentially release the locking means of each actuator in the multiple actuator system and obtain a predetermined sequential movement of the actuators in said multiple actuator system.

10. The multiple actuator system set forth in claim 9 wherein each actuator includes a worm wheel having engagement with its rotatable and axially movable assembly, actuator movement being dependent upon and effecting rotation of said worm wheel.

11. The multiple actuator assembly set forth in claim 10 wherein the torque transmitting means interconnecting each screw shaft with an adjacent actuator includes a rotatable worm shaft assembly engaging each worm wheel, and a rotatable shaft interconnecting the worm shaft of each actuator with a screw shaft of each adjacent actuator.

12. The multiple actuator system set forth in claim 9 wherein each rotatable and axially movable assembly is journalled in ball bearing assemblies carried by said nuts, and wherein the means engageable with said rotatable and axially movable assembly for effecting movement thereof comprises a bearing insert carried by each nut.

References Cited by the Examiner

UNITED STATES PATENTS

| | | | |
|---|---|---|---|
| 1,163,688 | 12/15 | Rice | 192—143 |
| 2,013,891 | 9/35 | Lotts | 188—71 |
| 2,651,397 | 9/53 | Miller | 192—143 |
| 2,759,569 | 8/56 | Keehn | 303—89 X |
| 2,979,034 | 4/61 | Geyer | 92—17 |
| 3,037,819 | 6/62 | Sukala | 303—89 |

ARTHUR L. LA POINT, *Primary Examiner.*

DUANE A. REGER, *Examiner.*